US006655660B2

(12) United States Patent
Wales

(10) Patent No.: US 6,655,660 B2
(45) Date of Patent: Dec. 2, 2003

(54) SLIDING VALVE FOR A SHOWER HEAD

(75) Inventor: Michael Wales, Riverside, CT (US)

(73) Assignee: Resources Conservation, Inc., Stamford, CT (US)

(*) Notice: Subject to any disclaimer, the term of this patent is extended or adjusted under 35 U.S.C. 154(b) by 19 days.

(21) Appl. No.: 09/781,051

(22) Filed: Feb. 9, 2001

(65) Prior Publication Data

US 2002/0109120 A1 Aug. 15, 2002

(51) Int. Cl.[7] .................................................. F16K 1/00
(52) U.S. Cl. ....................................... 251/319; 251/284
(58) Field of Search ................................. 251/319, 284

(56) References Cited

U.S. PATENT DOCUMENTS 301,416 A * 7/1884 Wiley ......................... 251/319
3,231,236 A * 1/1966 Hodel et al. ................ 251/284
3,258,026 A * 6/1966 Weaver ...................... 137/375
3,605,812 A * 9/1971 Richter .................... 137/627.5
3,632,083 A * 1/1972 Meeks ........................ 251/282
3,780,984 A * 12/1973 Ambrose et al. ........... 251/282
3,847,371 A * 11/1974 Norton et al. .............. 251/319
4,134,573 A * 1/1979 Messinger .................. 251/324
4,135,699 A * 1/1979 Petzsch et al. .............. 251/320
4,155,492 A * 5/1979 Seaton ....................... 222/592
D254,146 S * 2/1980 Koenig ...................... D23/245
4,794,843 A * 1/1989 Poling ................... 137/625.17
5,522,796 A * 6/1996 Dorsey, III .............. 137/596.2

* cited by examiner

*Primary Examiner*—Kevin Shaver
*Assistant Examiner*—David A Bonderer
(74) *Attorney, Agent, or Firm*—St. Onge Steward Johnston & Rennes LLC

(57) ABSTRACT

A valve assembly includes a slider controlling the water flow through the valve assembly and having a variably sized outer dimension. The slider has opposite ends, one of which receives a removable stop, whereas the other end is enlarged to form a flange arresting displacement of the slider in a predetermine position.

11 Claims, 5 Drawing Sheets

42 20 30 60 56 44 38 28 40 26 22 34 32 36

SLIDING VALVE FOR A SHOWER HEAD

FIELD OF THE INVENTION

The invention relates to a valve assembly and particularly to a sliding valve assembly capable of controlling the water flow through faucets and shower heads.

BACKGROUND OF THE INVENTION

Sliding valve assemblies are commonly used in the plumbing industry to effectuate a rate and volume of the water supply to a user. Typical of such valve assemblies is a slider which has a variable cross section along its longitudinal axis. As a result, while the slider is being displaced parallel to its longitudinal axis and, thus, transversely to the direction of water flow, it may close and open a water passage in a housing of the valve assembly.

Typically, axially spaced apart stoppers mounted on opposite ends of the slider limit its displacement within the housing. Thus, a user may remove the slider from the housing after removing either of the stoppers. The stoppers are received in annular grooves machined at the opposite ends of the slider.

Manufacturing of the grooves leads to a relatively cost inefficient product. Furthermore, there is no need to have two removable stoppers, since one removable stopper can be as effective as the pair and allow the removal of the slider from the housing.

It is, therefore, desirable to have a sliding valve assembly which has a slider provided with a single removable stopper. Also, a sliding valve assembly wherein the slider has an enlargement immovably formed on a body of the slider is also desirable, as is a method for manufacturing such valve assembly.

SUMMARY OF THE INVENTION

Accordingly, a valve assembly having a slider, one end of which is recessed to receive a stopper, whereas the opposite end is knurled, coined or stamped provides an effective and cost-efficient structure.

The valve assembly includes a housing provided with a channel which directs the water flow toward a discharge end of the assembly, and a slider which is displaceable transversely to the water flow to controllably open and close the channel.

Furthermore, the slider is manufactured by a method wherein the steps of machining a groove at one end and enlarging the opposite end by coining, stamping or knurling are performed without re-adjusting the slider on the lathe.

It is, therefore, an object of the invention to manufacture a cost-efficient sliding assembly.

Another object of the invention is to provide a valve assembly with a slider having a stop received only on one of the opposite ends of the slider.

Yet another object of the invention is to provide a valve assembly having a slider which has one of its ends provided with an enlargement formed unitarily with the end by means of knurling, coining or stamping.

Still a further object of the invention is to provide a method for manufacturing the valve assembly.

The above and other features, objects and advantages will be become more readily apparent from the following description of a preferred embodiment discussed in conjunction in the accompanying drawing.

DETAILED DESCRIPTION OF THE DRAWINGS

Figure 1:
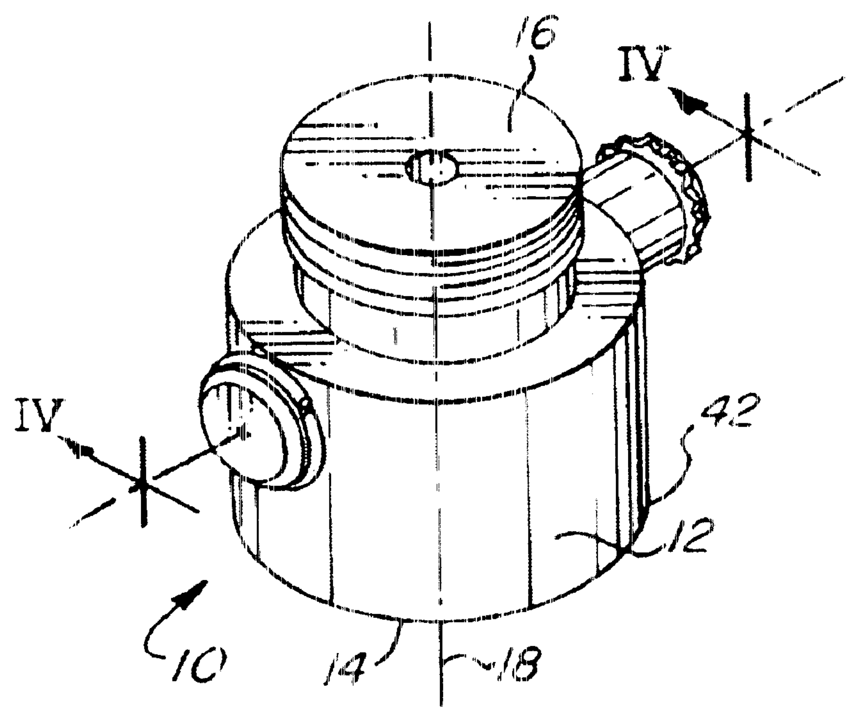
FIG. 1 is an isometric view of a valve assembly in accordance with the invention.
Figure 2:
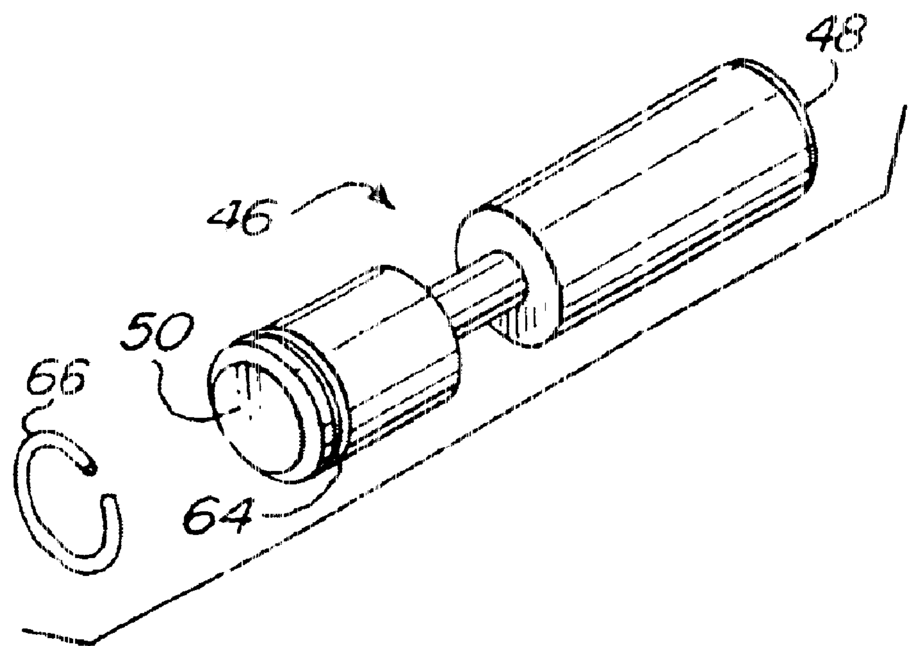
FIG. 2 is an exploded perspective view of a slider of the valve assembly shown in FIG. 1.
Figure 3:
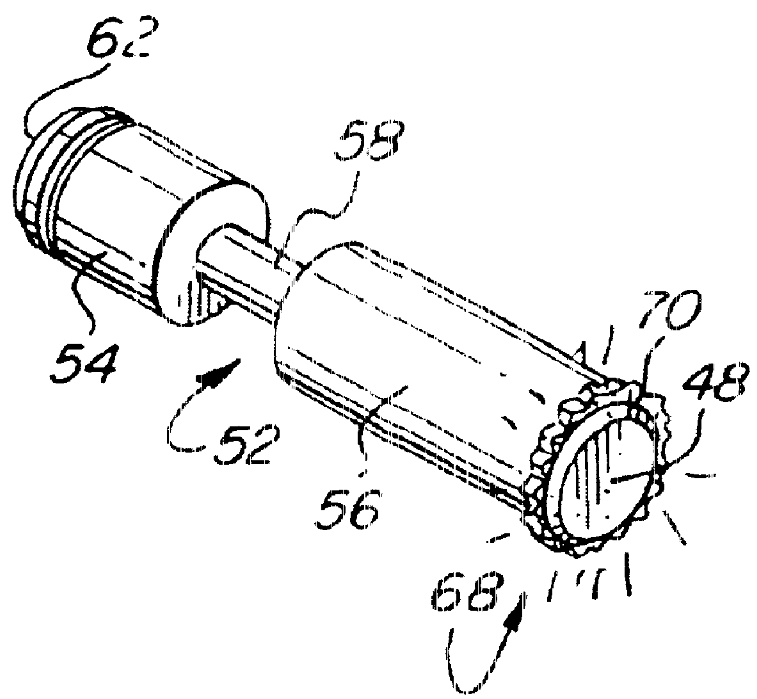
FIG. 3 is an isometric view of the slider of FIG. 2.

Referring to FIGS. 1–4, a valve assembly 10 includes a housing 12 having inlet 14 and discharge 16 ends and extending along a center axis 18. The housing 12 is provided with axial channels 20, 22 which are spaced axially apart. A third channel 28 extends along an axis 28 transversely to the axis 18 and separates the axial passages 20, 22.

The inlet end 16 has a reduced outer diameter and is provided with an outer thread 30 adapted to receive a variety of jet-distributing tools. The inlet end 14 formed with a central bore 32 has an inner thread 34 adapted to receive a water supply pipe 36.

The channel 26 opens at its opposite ends 38 and 40 into an outer peripheral wall 42, which, in the region of the end 40, has a hole provided with an annular slanted periphery 44 extending inwardly from the wall 42.

A slider 46 adapted to close and open the axial channels 20, 22 has opposite ends 48, 50 and a body 52 formed with two end regions 54, 56 which have the same outer diameter slightly smaller than a diameter of the channel 26. Accordingly, after the slider is inserted into the channel 26, its outer surface is in sliding contact with an inner surface of the housing defining the channel 26.

A region 58 of the slider, which separates the end regions 54 and 56, has a diameter smaller than that of these end regions and of passages 20, 22. Although a length of the region 58 can be less than a diameter of the passages 20, 22, it is preferred that the length is at least equal to the diameter of water passages. Accordingly, as the slider moves along the channel 26, its regions 54 and 56 block the passages 20, 22 and, thus, interrupt the water flow. When the region 58 is aligned with the passages, the water flow runs through the passages 20, 22 at a slightly reduced rate caused by the resistance of the region 58 to the water flow. Note, the region 58 of the slider is shown with a uniform outer dimension. However, as shown in phantom lines in FIG. 4 and more particularly shown in solid line in new FIG. 5, this region may have a surface 60 with a variable outer dimension to gradually vary the water flow from the full flow to no flow at all. Further note, that although the slider as shown has a cylindrical shape, other shapes such as polygonal ones can be implemented as well.

The end 50 of the region 54 has a reduced diameter knob 62 pressed upon by a user in order to displace the slider along the channel 28 and an annular recess 64 receiving a removable stop 66 after the slider has been displaced through the channel 26. The stop 66 thus limits displacement of the slider preventing it from voluntary sliding from the channel.

Figure 4:
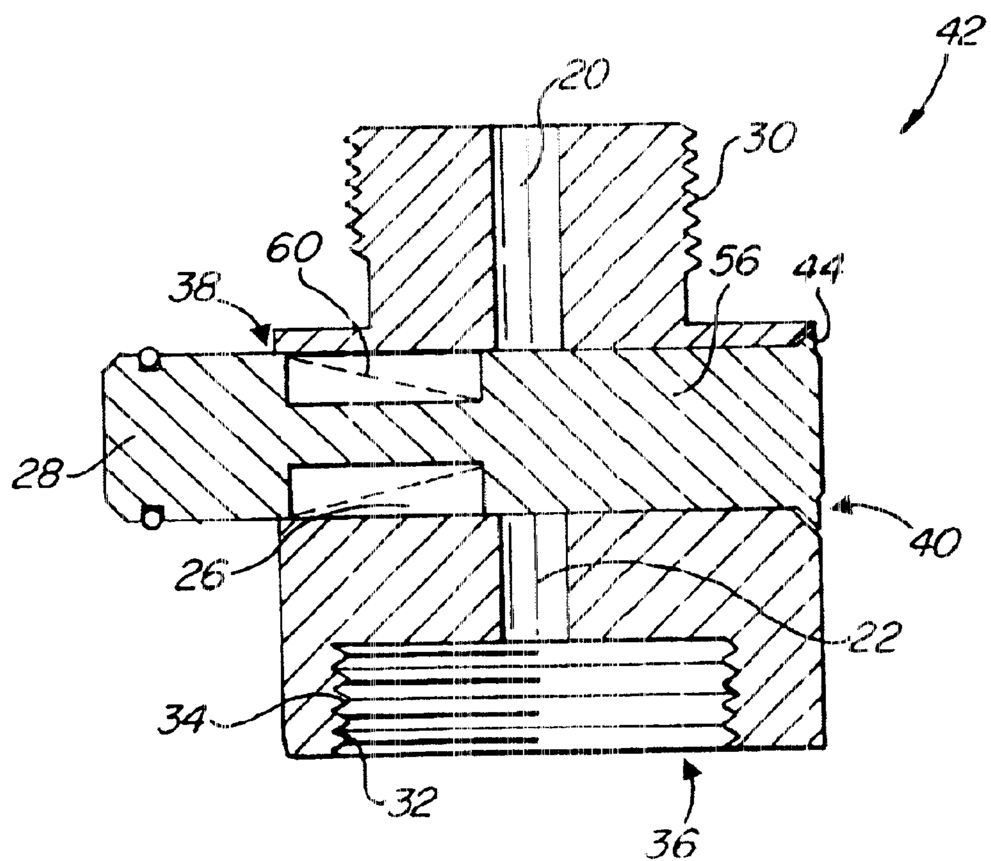
FIG. 4 is a sectional view of the valve assembly taken along lines IV—IV in FIG. 1.
Figure 5:
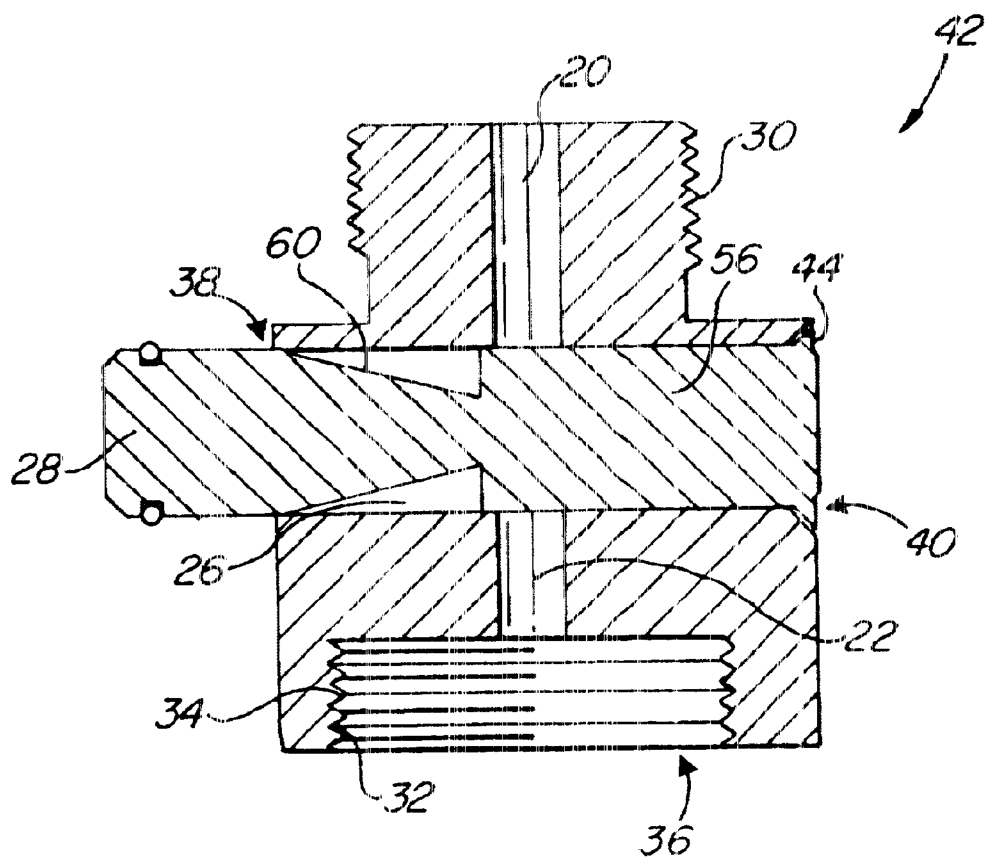
FIG. 5 is a sectional view of the valve assembly showing the variable outer dimension.

The opposite end 48 of the slider has an enlargement 68. To provide the enlargement, knurling, stamping or coining of the slider is performed in a lathe without dismounting the slider for further readjustment. Knurling is a simple operation that does not require precise tooling and yet the thus machined end 48 effectively stops the displacement of the slider within the channel 26. As seen in FIG. 4, the slanted region 44 formed in the wall 42 provides a nest for a knurled flange 70 when the slider reaches a position, wherein the water flow is completely blocked. In this position, the end 48 is practically flushed with the outer wall providing thus the assembly with an aesthetically appealing feature.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A valve assembly for a plumbing fixture comprising:

a housing having an inlet channel and a discharge channel for defining a water passage;

a slider channel in said housing placed between said inlet and discharge channels and intersecting the water passage;

a slider displaceably placed in said slider channel and having a conical shape for gradually varying a flow rate of water as said slider is displaced within said slider channel;

a removable stop provided on a first end of said slider to stop said slider from moving; and an englargement integrally provided immovably on a second end opposite said first end to stop said slider from moving.

2. The valve assembly defined in claim 1 wherein the slider channel has opposite ends, one of which is delimited by an inwardly slanted surface forming a nest for receiving a stop.

3. The valve assembly defined in claim 2 wherein the stop has an outer face substantially flush with an outer surface of the housing after the stop is received in the nest in one position of the slider.

4. The valve assembly defined in claim 2 wherein the stop is an annular flange which is formed by a means selected from the group consisting of coining, stamping and knurling.

5. The valve assembly defined in claim 1 wherein the opposite end of the slider has a recess receiving a said stop having an outer diameter larger than an opening in the housing which defines the end of said slider channel opposite said one end, the stop presses against the outer surface of the housing.

6. The valve assembly defined in claim 1 wherein said slider has a first periphery and a second periphery, said second periphery has an outer dimension less that that of said first periphery to allow the water to flow through the water passage.

7. The valve assembly defined in claim 6 wherein said first periphery is larger than a diameter of the water passage.

8. The valve assembly defied in claim 6 wherein said second periphery has a uniform outer dimension.

9. The valve assembly defied in claim 6 wherein said second periphery has a outer dimension.

10. The valve assembly of claim 1, further comprising a removable stop provided on an end of said slider to inhibit displacement of said slider.

11. The valve assembly of claim 1, further comprising an integrally formed stop provided on an opposite end of said slider to inhibit displacement of said slider.

* * * * *